T. HOLLAND.

LUBRICATOR.

No. 6,975.

Reissued March 7, 1876.

Witnesses:

H. Weeks Jr.

Opnd J. Sunny

Inventor:

Timothy Holland

UNITED STATES PATENT OFFICE.

TIMOTHY HOLLAND, OF NEW YORK, N. Y.

IMPROVEMENT IN LUBRICATORS.

Specification forming part of Letters Patent No. 83,965, dated November 10, 1868; reissue No. 6,975, dated March 7, 1876; application filed December 20, 1875.

*To all whom it may concern:*

Be it known that I, TIMOTHY HOLLAND, of the city, county, and State of New York, have invented certain Improvements in Lubricators, of which the following is a specification:

This invention relates to vessels for lubricating journals with oil or other lubricating-liquid, whereby the ordinary glass lubricator is rendered more efficient than it has hitherto been.

The invention consists in the combination of a loose screw-threaded metallic collar, placed upon the neck of the glass oil-holder, and a projecting glass rib, formed upon said neck to prevent the collar from turning when the tube is screwed on.

The invention further consists in the construction of the said collar of a ring cut open or divided, so as to be placed and retained upon the neck of the oiler, under the lip aforesaid.

The invention also comprises a novel means of providing a light joint between the oil-holder and the oil-cap of the lubricator.

Figure 2:
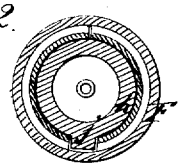
Figure 1:
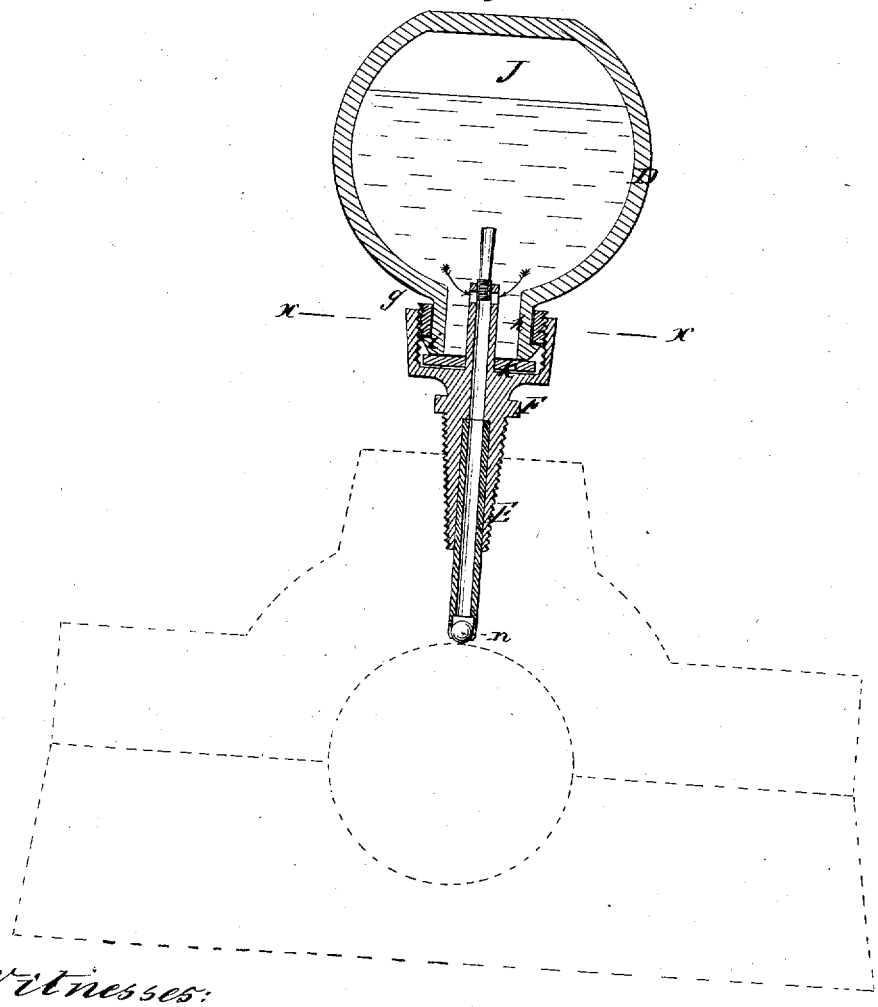

Figure 1 represents a vertical central section of an oiler constructed according to my invention applied to a journal-box, with a ball resting on the journal. Fig. 2 is a cross-section of Fig. 1 through the line *x x*.

E is the oiler-tube, which is adjustable in the cap of the oiler, as it is made to slide out and in, as seen in the drawing. F is the oiler-cap, which screws onto the screw-threaded collar *g* on the neck of the oiler. This collar *g* may be formed of a ring cut open and sprung onto the neck, or made in two or more segments and placed upon the lip *i* on the neck *h* of the oiler, as shown. Upon the neck of the holder D is a rib, *j*, arranged in relation with the collar *g*, as shown in Fig. 2, thereby preventing the collar from turning upon the neck when the cap F is screwed on. *k* is a rubber packing-ring, to insure a tight joint at the end of the glass neck. The end of the neck is beveled off for the purpose of more readily indenting the rubber packing.

The aperture near the discharge end of the tube E is enlarged, so as to form a chamber, in which is placed loosely a ball, *n*. It is retained in the chamber, when the oiler is in use, by resting on the journal, as shown in Fig. 1. When the oiler is detached it is kept in the chamber by the edge *a'*, which is turned over on the end of the tube. As the journal revolves the ball revolves and distributes the oil uniformly, and prevents friction on the journal.

The vacuum J in the oil-holder, in this description of lubricator, is overcome by the vacuum produced by the motion of the revolving journal, so that the oil is drawn down when the journal is in motion, and is retained by the vacuum at J when the journal is at rest.

What I claim as my invention is—

1. The combination of the rib *j* on the neck of the oil-holder D and the collar *g*, formed and applied substantially as and for the purpose set forth.

2. The collar *g*, cut open or divided, substantially as set forth, in combination with the lip *i* on the neck of the oil-holder, for the purpose specified.

3. The neck *h* of the oil holder, constructed with the beveled end, in combination with the packing *k* and the oiler-cap F, substantially as and for the purpose set forth.

TIMOTHY HOLLAND.

Witnesses:

H. WELLS, Jr.,
WM. A. J. TUNNEY.